United States Patent [19]

Wirth

[11] Patent Number: 5,088,334
[45] Date of Patent: Feb. 18, 1992

[54] LEAF SPRING DYNAMOMETER

[75] Inventor: Johannes Wirth, Zurich, Switzerland

[73] Assignee: Wirth Gallo Messtechnik AG, Zurich, Switzerland

[21] Appl. No.: 130,713

[22] Filed: Dec. 8, 1987

[30] Foreign Application Priority Data

Dec. 10, 1986 [CH] Switzerland ............... 04923/86

[51] Int. Cl.⁵ ............................ G01L 1/10; G01L 1/04
[52] U.S. Cl. ................................ 73/862.59; 73/862.64; 177/229
[58] Field of Search ...... 73/862.59, 517 AV, DIG. 1, 73/862.64; 177/210 FP, 229

[56] References Cited

U.S. PATENT DOCUMENTS 2,880,612  4/1959  Coyne et al. ............... 73/DIG. 1
3,969,934  7/1976  Raskin ....................... 73/862.64 X

FOREIGN PATENT DOCUMENTS 0016238  10/1980  European Pat. Off. ............ 177/229

Primary Examiner—Charles A. Ruehl
Attorney, Agent, or Firm—Johnson & Gibbs

[57] ABSTRACT

A dynamometer comprising a pair of similar leaf springs (4 and 5), lying in approximately the same plane, and at least one additional leaf spring (24). The outer part of the additional leaf spring (24) and any other supplementary leaf springs (6, 7, 19, and 20) replacing the single leaf spring and being fastened to the frame (1) and the inner part being fstened to the middle block (8). The leaf springs (6, 7, and 24) lie in a plane approximately parallel to that of the first pair of leaf springs (4 and 5), while the supplementary leaf springs (19 and 20) lie in the same plane as the first pair of leaf springs (4 and 5). An elastic rod (9 and 10) is attached to the middle of each of the leaf springs (4 and 5), respectively, and a force-measuring device (11) is located between these rods. The force being measured is exerted perpendicularly to the planes of the leaf springs (4 through 7, 19, 20, and 24) on the middle block (8) as a compressive or tractive force, and the middle block is displaced in a parallel direction by the leaf springs. At the same time, the rods (9 and 10) are either spread apart or forced closer together, and the force-measuring device (11) is affected accordingly.

5 Claims, 2 Drawing Sheets

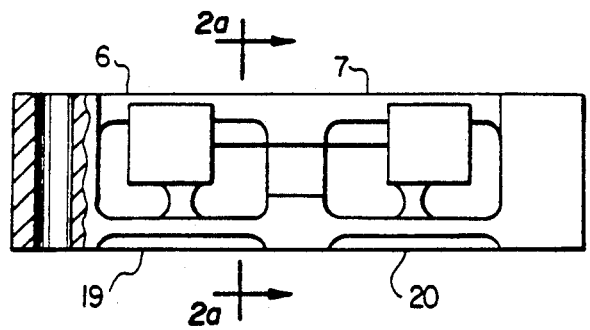
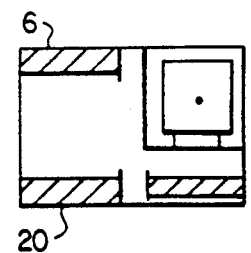
*FIG. 2*  *FIG. 2a*
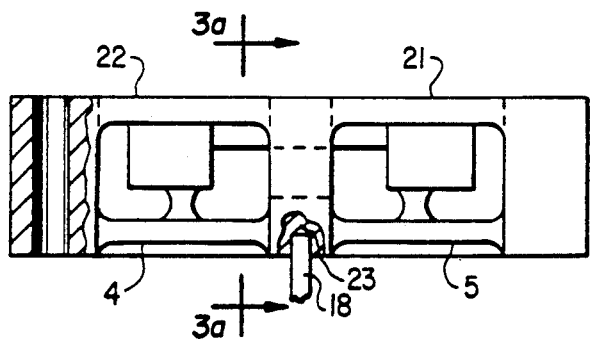
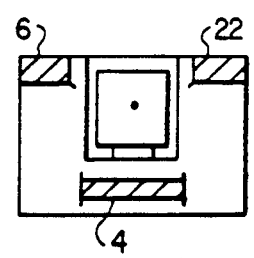
*FIG. 3*  *FIG. 3a*
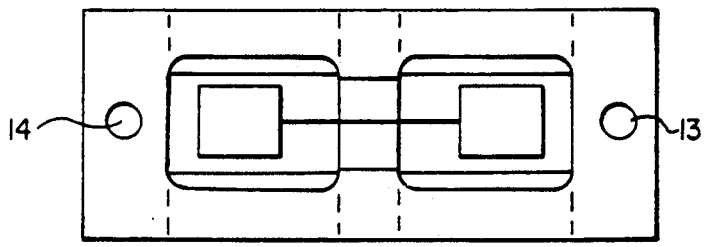
*FIG. 3b*
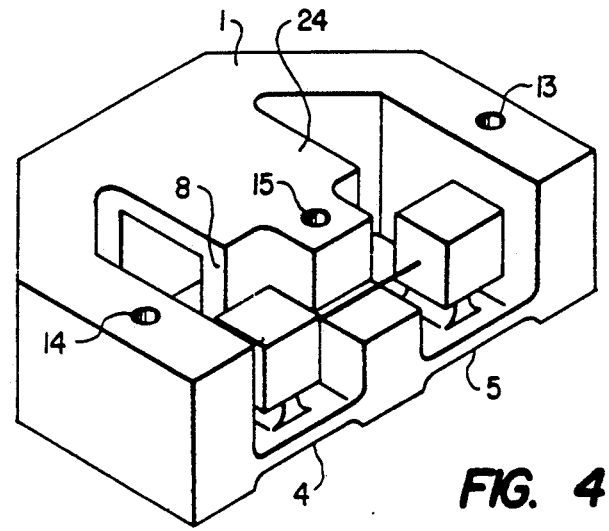
*FIG. 4*

LEAF SPRING DYNAMOMETER

BACKGROUND OF THE INVENTION

1. Field of the Invention

The present invention relates to dynamometers, and more particularly, to a dynamometer with an elastic parallel scaling mechanism.

2. History of the Prior Art

The prior art is replete with dynamometer designs. One dynamometer design which is a pertinent reference herein is shown in European patent number B1-0 016 238. The device shown therein is of considerable height and due to its asymmetry, it undergoes high bending forces when in use. This leads to problems with a lag-free fastener. The conventional design is thus costly to manufacture. It would be an advantage therefore to provide a low dynamometer that is simple and cheap to manufacture with numerically controlled machines.

The present invention overcomes the problems of the prior art by providing a dynamometer in which a portion of the force being measured, usually the greater part, is absorbed by elements that bend elastically. The force is transmitted directly to the frame of the dynamometer, so that only a portion of the force, usually a small portion, is applied to actual measuring device.

SUMMARY OF THE INVENTION

The present invention relates to dynamometers with parallel spring scaling mechanisms. More particularly, one aspect of the present invention includes a dynamometer constructed with at least three leaf springs into a pair of identical leaf springs and least one other leaf spring, which lie in two planes that are at least approximately parallel to each other, the outer sides or ends of which are attached to the frame and the inner sides or ends of which are attached to a block that is basically L shaped. An elastic rod is fitted perpendicularly into the middle of the two paired leaf springs. A force-measuring device is then attached between these elastic rods, where it is subjected to the force being measured. The force is exerted on the L-shaped block. The invention is also characterized by the fact that it is of a lower design, which depends on the distance between the two planes in which the leaf springs lie. This makes it necessary to install the L-shaped block parallel. The force-measuring device is located between the two planes. As stated above, the force being measured, usually the greater part, is then absorbed by elements that bend elastically and is transmitted directly to the frame of the dynamometer so that only a portion of the force, usually a small portion, is applied to the actual measuring device.

For a more complete understanding of the present invention and for further objects and advantages thereof, reference may now be had to the following description taken in conjunction with the accompanying drawings in which:

FIGS. 2 and 2(a) illustrate a second sample design with three pairs of leaf springs in a front view and a cross-sectional view;

FIGS. 3 through 3(b) illustrate a third sample design, also with three pairs of leaf springs, in a front view, a top view and a cross-sectional view; and FIG. 4 is a perspective view of a fourth sample design with three leaf springs.

DETAILED DESCRIPTION

Figures 1, 1A:
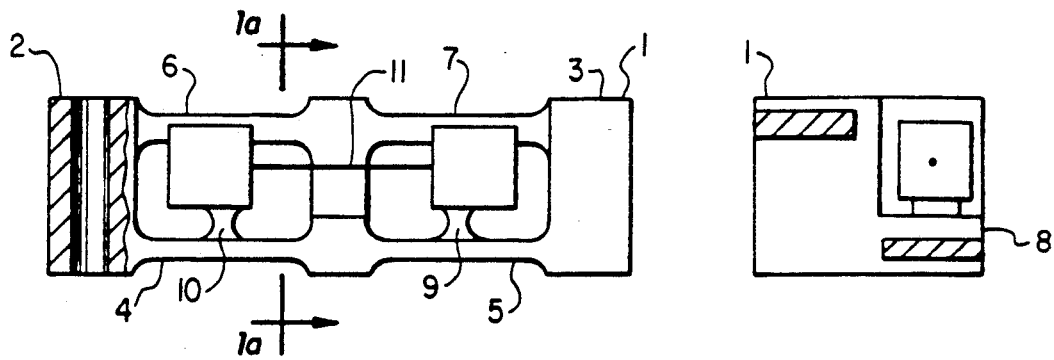
FIGS. 1 through 1(c) illustrate one embodiment of the present invention with two pairs of leaf springs, in a front view, a top view, a cross-section and a perspective view (respectively.
Figure 1B:
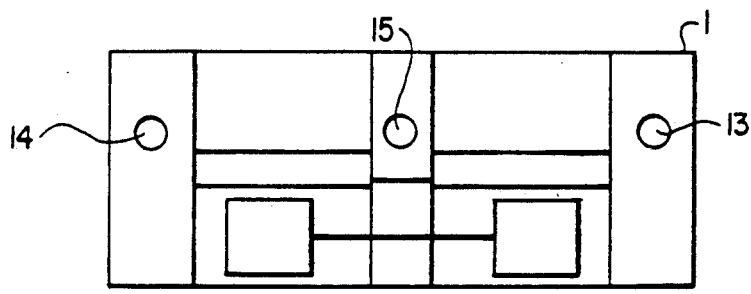
Figure 1C:
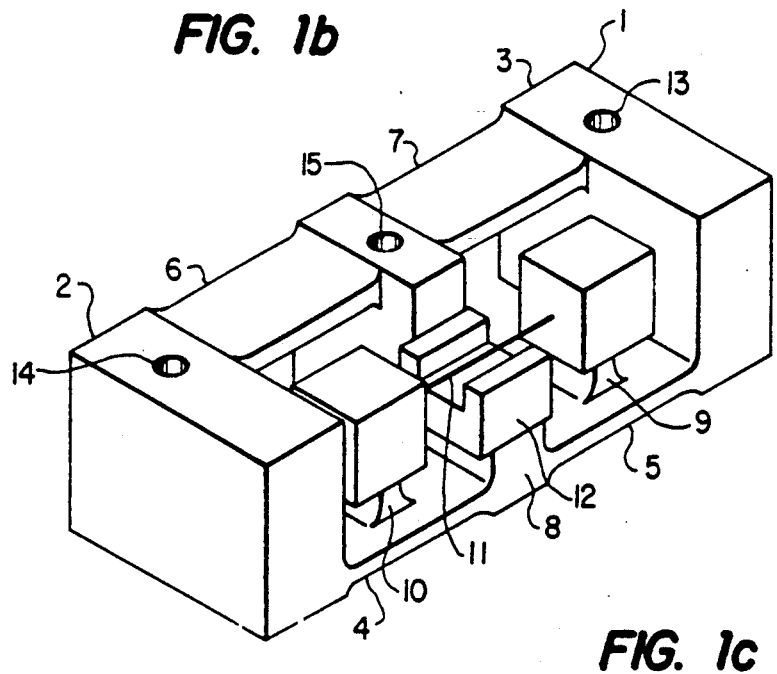

Referring first to FIGS. 1 through 1(c) there is shown the dynamometer of the present invention. The inventive dynamometer shown in FIGS. 1 through 1(c) consists of a frame (1) divided into two blocks (2 and 3), two lower leaf springs (4 and 5), two upper leaf springs (6 and 7) and a basically L-shaped block (8) in the middle. The four leaf springs (4 through 7) are attached to the end blocks (2 and 3) on one end, and to the middle block (8) on the other end. Two elastic rods (9 and 10) are located in the middle of the lower leaf springs (4 and 5) perpendicular to the plane of these leaf springs (4 and 5) to support the force-measuring device (11). Piezoelectric quartz, an extensometer or strain gauge mounted on an elastic support or a transversely oscillating cord is shown here as the force-measuring device. Such an oscillating cord with an excitation magnet (12) mounted on the horizontal leg of the middle L-shaped block (8) is shown in FIGS. 1 through 1(c) as representative of these devices. For illustrative purposes, the magnet (12) is shown only in FIG. 1(c).

The leaf springs (4 and 5) supporting the elastic rods (9 and 10) are designed to be thinner than the other pair of leaf springs (6 and 7) so that the elastic shunt ratio becomes greater. The force-measuring device (11) itself is only subjected to a small portion of the force being measured.

Each of the blocks (2 and 3) has a hole (13 and 14) drilled all the way through. They are fastened to the support with fittings (not shown) installed through the holes (13 and 14).

The middle block (8) is also drilled with a hole (15), but it is blind [i e., not drilled all the way through]. The hole (15) may be drilled in the block (8) from above or from below, depending on whether the force to be measured is applied as a compressive or a tractive force and depending also on other design features of the force-measuring device.

However, this inventive concept also includes drilling the hole (15) all the way through. A tension member can then be run the length of the hole (15) and fastened in place on the rear of the block (8), i.e., on the side of the block facing away from the direction of the pull.

The force being measured may also be sensed, for example, by a pin (18) installed in the hole (15). As the force is applied, the four leaf springs (4 through 7) deform into an S shape and the middle block (8) is displaced upward in a parallel position. The elastic rods (9 and 10) flex away from each other and the transversely oscillating cord, which is shown here as the force-measuring device, is also tautened. It should be understood, of course, that the inventive concepts illustrated in FIGS. 1 through 1(c) can be inverted. The invention further includes the concept of tensioning the cord so tautly that the force being measured partially slackens the cord. The inventive concept also encompasses tensioning the cord in the medium range. Forces alternating from compressive to tractive can then be measured FIG. 1 is a front v of the first sample design, and FIG. 1(b) is a top view of the same design. A cross-sectional view through Line AA 1(a)-1a) is shown in FIG. 1(a). This line passes through the two lower leaf springs (4 and 6). FIG. 1(c) is a perspective drawing.

/FIGS. 2 and 2(a) illustrate a second sample design. This second design, in comparison with the sample design in FIGS. 1 through 1(c), has two additional leaf springs (19 and 20). Their outer sides or ends are also attached to the blocks (2 and 3) and their inner sides or ends are attached to the L-shaped middle block (8). The other design features are the same as in FIG. 1 through 1(c).

FIGS. 3, 3(a), and (b) show a third sample design of the invention. This design also has a total of six leaf springs. The leaf springs (4 through 7) as shown in FIGS. 1 through 1(c) are supplemented by two more leaf springs (21 and 22), which lie in the same plane as the upper pair of leaf springs (6 and 7). The middle block (8) is thus shaped basically like a double L. The six leaf springs 4 through 7, 21, and 22) lie basically in two parallel planes. The sample design illustrated in FIG. 3 is perfectly symmetrical along the longitudinal axes defined by the holes (13 and 14). A compressive force being measured is sensed by the pin (18) located in a middle hole (23).

FIG. 4 is a perspective drawing of a fourth sample design. The frame (1) has the approximate shape of the letter C. A single upper leaf spring (24) supports the L-shaped block (8), to which the leaf springs (4 and 5) are attached. The bending axes of the single leaf spring (24), on the one hand, and of the pair of leaf springs (4 and 5), on the other hand, are now perpendicular to each other. As in the other sample designs, each of the two leaf springs (4 and 5) supports an elastic rod (9 and 10, respectively), and the force-measuring device (11) is installed between these rods, in this case, a pre-tensioned transversely oscillating cord.

As in the previous sample designs, the frame has two holes (13 and 14), which serve to fasten the dynamometer to the support. A hole (15) is also drilled in the block (8). The three holes (13, 14, and 15) lie in the same plane. The force being measured is directed into the middle hole (15) by means of suitable parts like pins or tension wires. In the case of FIG. 4, the force being measured is a compressive force acting upward from below. A pin (not shown) transmitting the compressive force is thus forced into the hole (15) form below. A pin transmitting a tractive force (also not shown), which is suitably fastened inside the hole, pulls from above. As in FIGS. 1 through 1(c), the direction of the force can also be reversed in the case of this design. This remains true if, for example, piezoelectric quartz is used as a force-measuring device (11) instead of an oscillating cord.

Having described the invention in connection with certain specific embodiments thereof, it is the be understood that further modifications may now suggest themselves to those skilled in the art and it is intended to cover such modifications as fall within the scope of the appended claims.

What is claimed is:

1. A dynamometer for measuring a force and being constructed with an elastic parallel scaling mechanism having a frame (1), constructed with an L-shaped bock (8) the dynamometer comprising:

a pair of similar leaf springs (4 and 5), lying in approximately the same plane which comprise an elastic absorption mechanism such that a portion of the force being measured is absorbed thereby and, in which an outer part of each leaf spring (4 and 5) is attached to the frame (1) and an inner part of each spring is attached to the L-shaped block (8);

at least one additional leaf spring, the outer part of which being attached to the frame (1) and the inner part being attached to the block (8), and which lies in a plane approximately parallel to that of the paired leaf springs (4 and 5);

first and second elastic rods (9 and 10), each of said rods being installed in the middle of each of the paired leaf springs (4 and 5), respectively, such that each is perpendicular to the plane in which the leaf springs (4 and 5) lie;

a force-measuring device (11) being located between the two elastic rods (9 and 10) so that it is tautened by the force being measured, and said frame (1) having two holes (13 and 14) formed therein and the block (8) having one hole (15), all of which lie in the same plane.

2. The dynamometer as described in claim 1, further being characterized by the fact that the frame is essentially shaped like the letter C so that the additional leaf spring (24) has a bending axis perpendicular to each of the paired leaf springs (4 and 5).

3. The dynamometer as described in claim 1, and further including a second pair of similar leaf springs (6 and 7) lying in a plane approximately parallel to that of the first pair of leaf springs (4 and 5) with their bending axis being parallel to that of the first pair of leaf springs (4 and 5);

said second pair of leaf springs (6 and 7) lying opposite the first pair of leaf springs (4 and 5) and being offset laterally in their own plane by a distance of at least their own width; and the frame (1) being divided into two blocks (2 and 3).

4. The dynamometer as described in claim 1, and further including two additional pairs of leaf springs, each spring in a pair being similar to its counterpart, and arranged such that they lie in approximately parallel planes and one pair of leaf springs (6 and 7) lies in one plane and the other pair (19 and 20) lies in the other plane;

said pairs of springs (6, 7, 19, and 20) being located on top of one another;

said two leaf springs (4 and 5) with the elastic rods (9 and 10), respectively, being located opposite the other pairs of leaf springs (6, 7, 19, and 20) respectively, but offset to one side in their own plane by a distance of at least their own width; and said frame (1) being divided into two blocks (2 and 3).

5. The dynamometer as described in claim 1, and further including two additional pairs of leaf springs (6, 7, 21, and 22), each half of each additional pair being similar to the other half of the same pair, lying in approximately the same plane, which plane is approximately parallel to that of the first pair of leaf springs (4 and 5);

said additional leaf springs (6, 7, 21, and 22) being located symmetrically to the first pair of leaf springs (4 and 5) but offset laterally in their own plane by a distance of at least their own width;

said frame (1) being divided into two blocks (2 and 3); and said middle block (8) having a blind hole (23) and the other holes (13, 14, and 23) lying in the same plane.

* * * * *